(12) United States Patent
Capone et al.

(10) Patent No.: US 8,401,020 B2
(45) Date of Patent: Mar. 19, 2013

(54) METHOD FOR CONTROLLING ACCESS TO TDMA WIRELESS CHANNEL FROM NODES OF NETWORK OF EITHER LINEAR OR TREE TOPOLOGY

(75) Inventors: Antonio Capone, Milan (IT); Luca Coletti, Piave di Cadore (IT); Luigi Fratta, Segrate (IT); Lino Moretti, Milan (IT); Simone Redana, Orzinovi (IT); Nicola Riato, Caponago (IT)

(73) Assignee: Siemens S.p.A., Milan (IT)

( * ) Notice: Subject to any disclaimer, the term of this patent is extended or adjusted under 35 U.S.C. 154(b) by 654 days.

(21) Appl. No.: 11/988,182

(22) PCT Filed: Jun. 29, 2006

(86) PCT No.: PCT/EP2006/006300
§ 371 (c)(1),
(2), (4) Date: Jun. 5, 2009

(87) PCT Pub. No.: WO2007/003333
PCT Pub. Date: Jan. 11, 2007

(65) Prior Publication Data
US 2009/0296668 A1  Dec. 3, 2009

(30) Foreign Application Priority Data
Jul. 1, 2005 (EP) ..................... 05425475

(51) Int. Cl.
*H04L 12/28* (2006.01)
*H04L 12/56* (2006.01)
(52) U.S. Cl. ............... 370/395.41; 370/328; 370/338; 370/348; 370/395.31

(58) Field of Classification Search ............ 370/338, 370/328, 395, 395.31, 395.41
See application file for complete search history.

(56) References Cited

U.S. PATENT DOCUMENTS

| 5,732,073 | A  | * | 3/1998 | Kusaki et al. | 370/280 |
|---|---|---|---|---|---|
| 5,742,795 | A  | * | 4/1998 | Kussel | 703/2 |
| 5,754,543 | A  | * | 5/1998 | Seid | 370/351 |
| 6,785,510 | B2 | * | 8/2004 | Larsen | 455/11.1 |
| 2006/0067213 | A1 | * | 3/2006 | Evans et al. | 370/229 |

OTHER PUBLICATIONS

"Definition and assessment of relay based cellular deployment concepts for future radio scenarios considering 1st protocol characteristics"; Winner IST-2003-507581 D3.4 V.1; 2005; pp. 1-118.

(Continued)

*Primary Examiner* — Dang Ton
*Assistant Examiner* — Robert M Morlan
(74) *Attorney, Agent, or Firm* — Staas & Halsey LLP

(57) ABSTRACT

Requests of resources of uplink flows towards a base station (BS) and/or downlink flows towards end nodes are computed by each requesting node on an end-to-end basis. Each requesting node issues a cumulative request given by summing up the same request for each link separating the node from the BS plus each link separating the BS from the destination node, enabling the centralized node to perform connection based scheduling. The BS in response to all cumulative requests grants uplink and/or downlink resources for each link. The profile of grants is equal to the profile of requests when the amount of resources requested is below the maximum net throughput on MAC layer. When not below the maximum net through-put on MAC layer, the ideal profile of grants is normalized with respect to a ratio between the maximum net throughput on MAC layer and the amount of the overall requested resources.

8 Claims, 10 Drawing Sheets

OTHER PUBLICATIONS

"Part 16: Air Interface for Fixed Broadband Wireless Access Systems"; IEEE Standard 802.16; Oct. 2004; pp. 139-151.

"Description of identified new relay based radio network deployment concepts and first assessment by comparison against benchmarks of well known deployment concepts using enhanced radio interface technologies"; Winner IST-2003-507581WP3 D3.1 v1.1; 2004; pp. 1-276.

International Search Report for Application No. PCT/EP2006/006300; mailed Aug. 17, 2006.

* cited by examiner

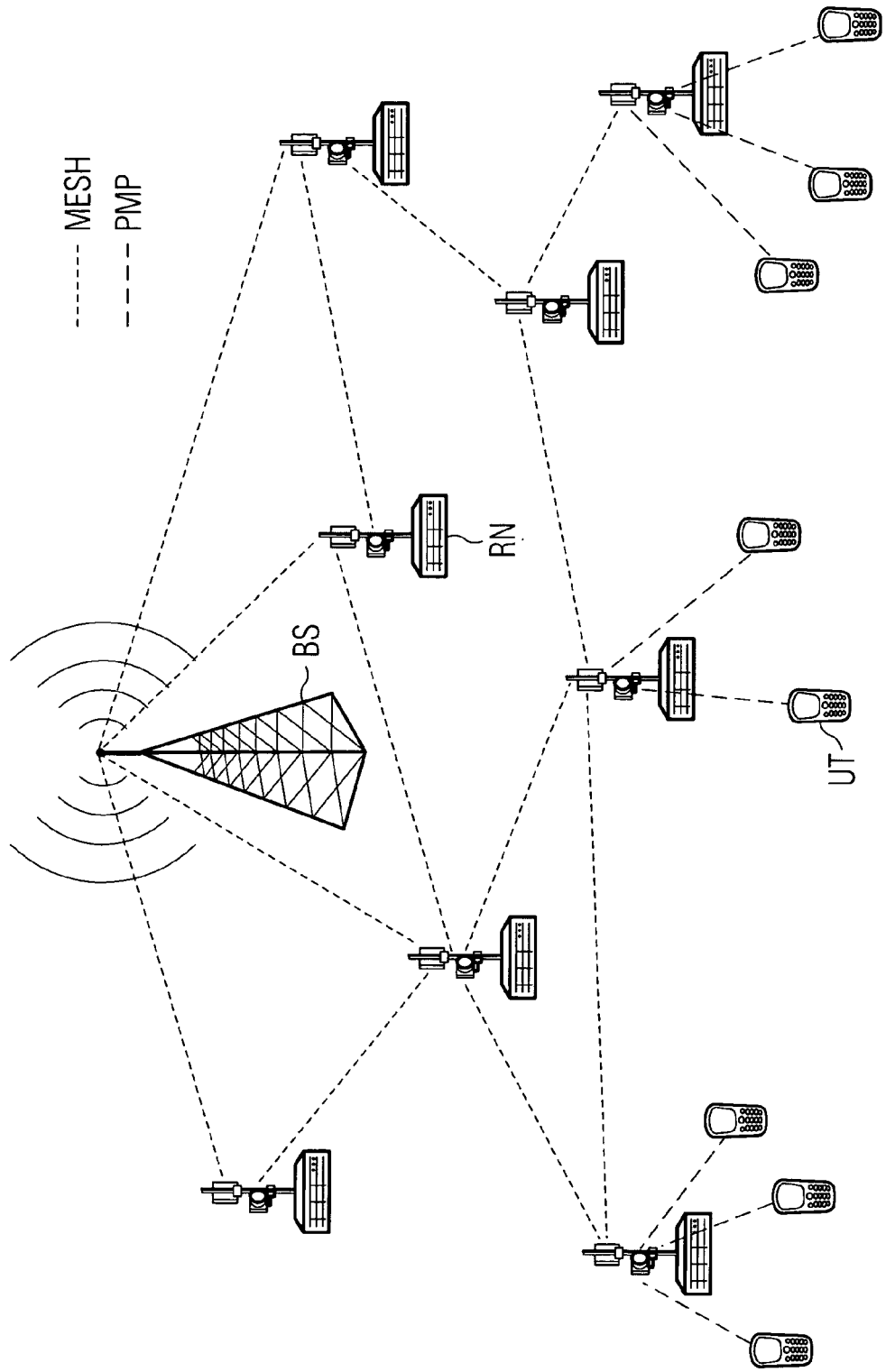

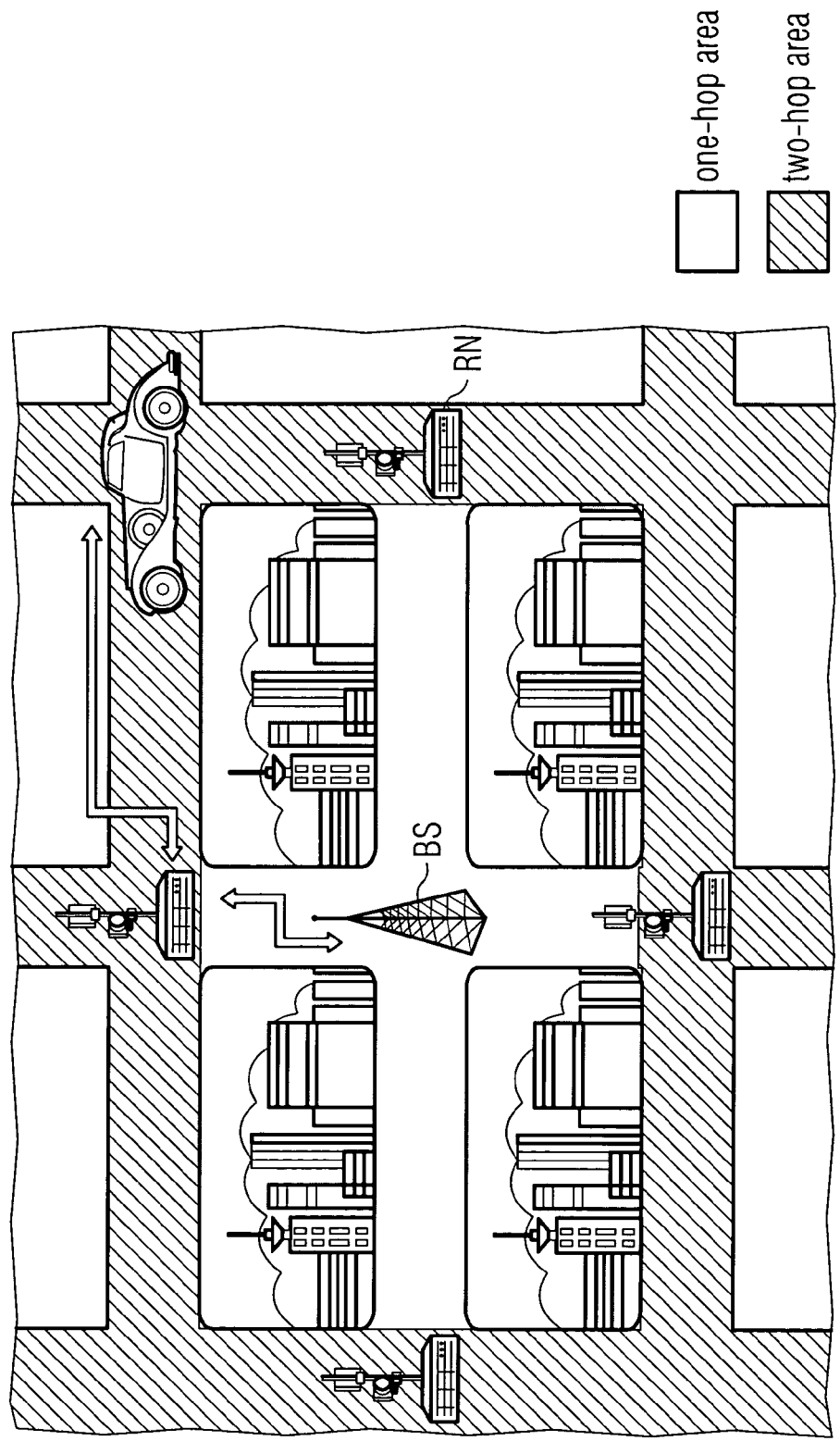

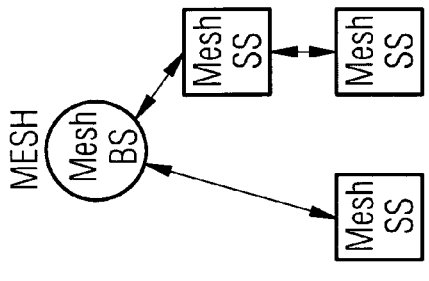
FIG 4  TRAFFIC FLOWS FOR PMP MODE
FIG 5  TRAFFIC FLOWS FOR MESH MODE
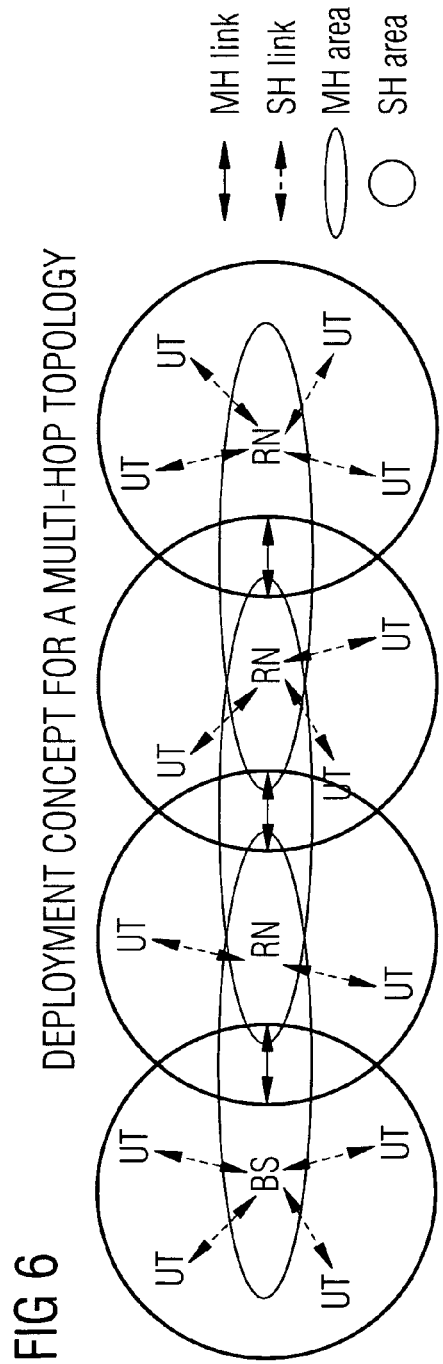
FIG 6  DEPLOYMENT CONCEPT FOR A MULTI-HOP TOPOLOGY

SIMPLIFIED HIERARCHICAL PMP
MULTI-HOP RELAYING CONCEPT

CENTRALIZED MULTI-HOP TOPOLOGY

REQUESTS PERFORMED FROM NODE (N,1) ADOPTING THE CONNECTION BASED SCHEDULING

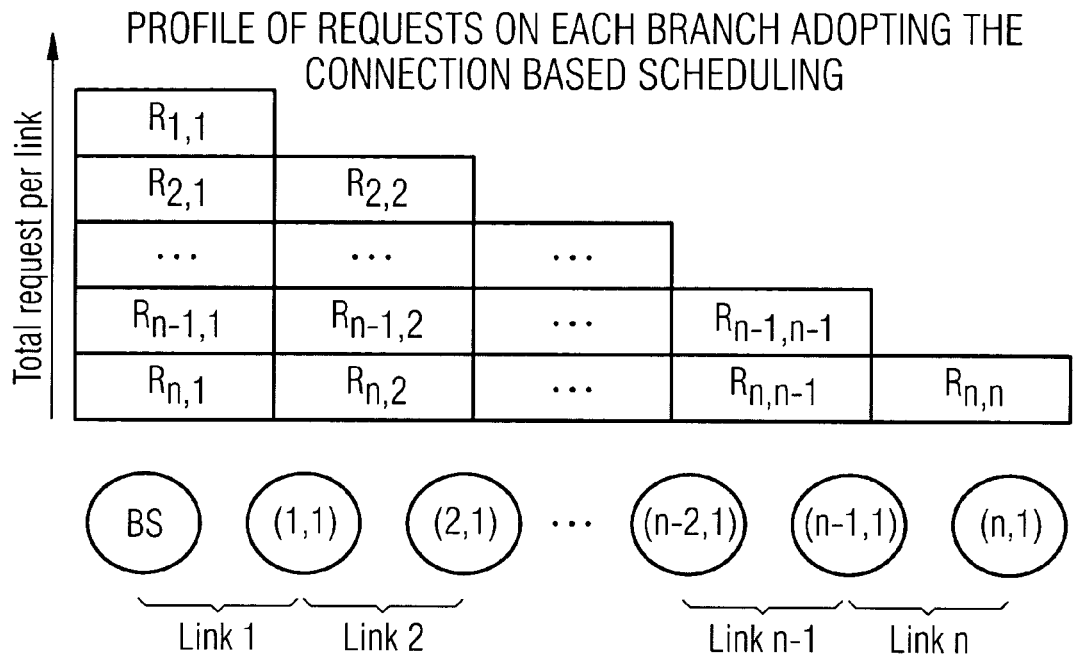
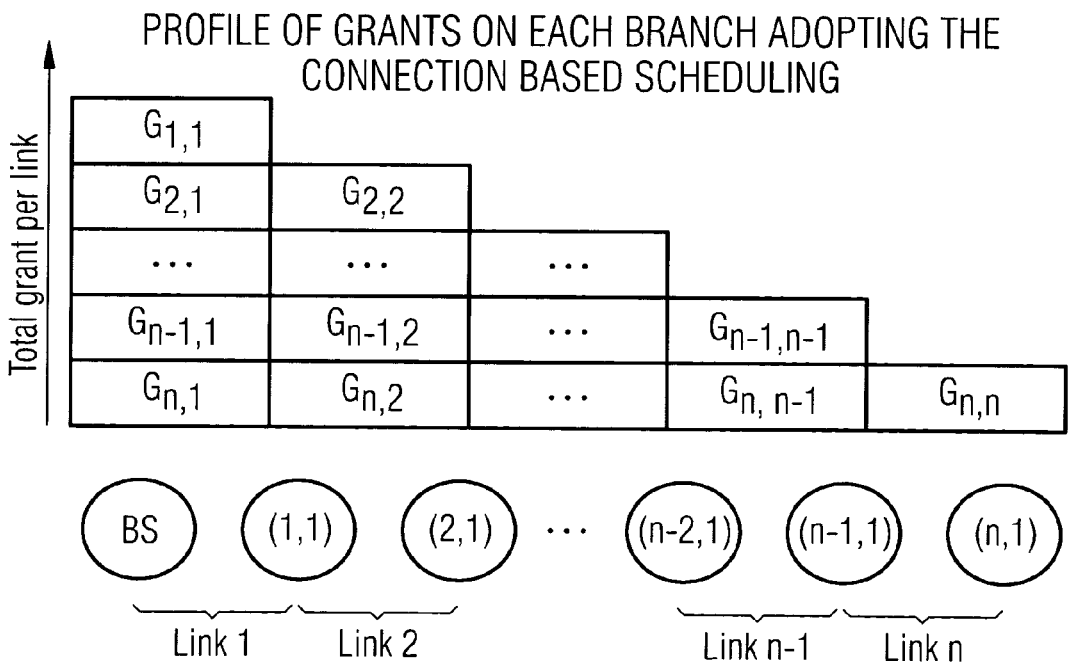

MESH FRAME STRUCTURE

MAC MANAGEMENT MESSAGES TRANSMITTED WITHIN THE SCHEDULE CONTROL SUB-FRAME

DATA SUBFRAME

DATA TRANSMISSION ORDER WITHIN DATA SUB-FRAME

METHOD FOR CONTROLLING ACCESS TO TDMA WIRELESS CHANNEL FROM NODES OF NETWORK OF EITHER LINEAR OR TREE TOPOLOGY

CROSS REFERENCE TO RELATED APPLICATIONS

This application is based on and hereby claims priority to European Application No. 054257475 filed on Jul. 1, 2005, the contents of which are hereby incorporated by reference.

BACKGROUND

The method described below relates to the field of communication networks, and more precisely to a connection based scheduling method for hierarchical multi-hop wireless networks extended to beyond 3G radio interface. Without limitation, the method will be described with reference to following standards for Wi-MAX:

[1] 802.16, "IEEE Standard for local and metropolitan area networks—Part 16: Air Interface for Fixed Wireless Access Systems, October 2004.

[2] IEEE P802.16e/D5-2004: "Draft IEEE Standard for Local and Metropolitan Area Networks—Part 16: Air Interface for Fixed Wireless Access Systems—Amendment for Physical and Medium Access Control Layers for Combined Fixed and Mobile Operation in Licensed Bands," September, 2004.

The following terminology is used:

Base Station: A base station (BS) is a stationary physical network element serving relay nodes or user terminals in a given geographical area via its radio access capabilities. It provides the interface towards the core network via a feeder system. Note that Access Point (AP) could be used synonymously for Base Station.

Relay Node: A relay node (RN) is a physical network element serving other relay nodes or user terminals in a given geographical area via its radio access capabilities. It is wirelessly connected to a base station, another relay node and/or a user terminal and forwards data packets between these network elements. Depending on whether its connections (BS-to-RN and RN-to-RN or RN-to-UT) are established with the same radio access technology in the same pool of transmission resources (e.g. RF channels) or not, one may distinguish between homogeneous relay nodes and heterogeneous relay nodes.

User Terminal: User terminal (UT) refers to physical network elements used by the end user to access a service or a set of services. Note that Mobile Terminal could be used synonymously for User Terminal.

BACKGROUND ART

In recent years, there has been an upsurge of interest in multihop-augmented infrastructure-based networks in both industry and academia, such as the "seed" concept in 3GPP, Mesh Networks in Ref. [1], coverage extent on of HiperLAN/2 through Relays or user-cooperative diversity mesh networks.

With reference to FIG. 1, a mesh topology could be defined as a topology in which there are at least three nodes with two or more paths between them, more precisely we define a mesh topology as a topology in which packets shouldn't necessarily go through the base station but could use direct routing if a path from source to destination exists inside the network.

Different approaches have exploited the benefits of multi-hop communications via fixed and/or mobile relays, such as solutions for radio range extension in mobile and wireless broadband cellular networks. Further, relaying is presented as a means to reduce infrastructure deployment costs. It is shown that multihop relaying can enhance capacity in cellular networks, e.g. through the exploitation of spatial diversity. The very high data rates envisioned for the 4th generation (4G) wireless systems in reasonably large areas do not appear to be feasible with the conventional cellular architecture due to two basic reasons: First, the transmission rates envisioned for 4G systems are as high as two orders of magnitude more than those of the 3G systems, and it is well known that for a given transmit power level, the symbol (and thus bit) energy decreases linearly with the increasing transmission rate. Secondly, the spectrum that will be released for 4G systems will almost certainly be located well above the 2 GHz band used by the 3G systems. The radio propagation in these bands is significantly more vulnerable to non-line-of-sight conditions, which is the typical mode of operation in today's urban cellular communications.

The brute-force solution to this problem is to increase the density of the base stations significantly, resulting in considerably higher deployment costs which would only be feasible if the number of subscribers also increased at the same rate. This seems unlikely, with the penetration of cellular phones already being high in the developed countries. On the other hand, the same number of subscribers will have a much higher demand in transmission rates, making the aggregate throughput rate the bottleneck in future wireless systems. Under the working assumption that subscribers would not be willing to pay the same amount per data bit as for voice bits, a drastic increase in the number of base stations does not seem economically justifiable.

It is apparent from the above discussion that more fundamental enhancements are necessary for the very ambitious throughput and coverage requirements of future systems. Towards this end, in addition to advanced transmission techniques and co-located antenna technologies, some major modifications in the wireless network architecture itself, which will enable effective distribution and collection of signals to and from wireless users, are required. The integration of multihop capability into known wireless networks is perhaps the most promising architectural upgrade.

Another possible scenario with respect to FIG. 1 above (where the relay node are also the User Terminal) for mesh networks development is shown in FIG. 2, where each mesh network element (relay) is a Point-to-MultiPoint (PMP) node. Relays are added so they can collect the traffic originated by terminals and transmit to the base station or to another relay. Hence two different types of data traffic flows could be foreseen: mesh traffic (dotted links) managed by the access point and PMP traffic (dashed links) managed by each relative PMP node. This is a sort of "mobile operator oriented" or "distributed feeder" mesh network, because the mobile operators can set up the fixed nodes in the needed positions. A simplified example of the relay implementation of FIG. 2 is the urban one depicted in FIG. 3, with a Bs at the crossroads ant four RNs at the corner.

In both scenarios outlined above, a first "layer" of relays surrounding the base station (or access point) can directly communicate with it. A second and further layer of relays can then be added to connect the terminals not already connected to the first layer, forming a tree-shaped topology. Relay stations are supposed to be fixed or movable, where movable means that they can be easily moved from one site to another (differently, e.g., from actual cellular BTS that once deployed is clearly very hard to move), preserving even the possibility of keeping the relays active during their re-positioning. In general, RNs have a defined topology; topology changes are possible (e.g., due to node failures), but probably not frequent. Therefore, the distribution of network state information is not much more complex than in wired networks, and even a centralized control of route selection can be adopted. In fact it is assumed that the BS knows the topology and global network state. Having fixed position, relay stations are expected not to suffer from power supply problems since they can be easily fed through electric distribution network, or through very long life rechargeable battery, or even through solar panels. The above examples point out the performance benefits that multihop relaying can provide in broadband networks when applied in certain scenarios.

Reference [1] complements the physical (PHY) layer specification for frequencies between 10 and 66 GHz published in this standard with advanced PHY layer design in the frequency band 2 to 11 GHz to cope with non-line-of-sight (NLOS) conditions and multi-paths propagation effects. Different to the single-carrier (SC) version above 11 GHz, it is proposed OFDM for the lower frequency range. Reference [1] provides either high speed wireless access as well as multi-hop capabilities through the two air-interfaces that are specified as: Point-to-Multi-Point (PMP) and Mesh mode. Traffic flows for PMP and Mesh modes are simplified in FIGS. 4 and 5, respectively.

With reference to FIG. 4, in PMP mode connections are established among the Base Station (BS) and Subscriber Stations (SSs), hence, data transmissions between two SSs are routed through the BS. Within the Mesh mode, traffic can occur directly among SSs since the protocol permits to set up data connections among neighbors, and supports multi-hop communication. With reference to FIG. 5, the BS in the Mesh mode is termed Mesh BS. The Mesh BS is the entity that interfaces the wireless network to the backhaul links. It acts like a BS in PMP mode except that not all of the SSs have to be directly connected to the Mesh BS. The MAC protocol for the Mesh mode shall support both centralized (Mesh CS) and distributed (Mesh DS) scheduling, or a combination of both. While the PMP supports both duplex schemes, Time Division Duplex (TDD) and Frequency Division Duplex (FDD), the Mesh mode only supports TDD because of its multi-hop support, i.e., communication between arbitrary SSs. The multi-hop traffic is realized between one access point (AP), respectively base station (BS), which is connected via wire to the fixed backbone network, and fixed relay node (RN). The last-hop traffic takes place between the AP/BS or RN and user terminals (UTs).

A typical deployment concept for the multi-hop air-interface is depicted in FIG. 6. With reference to FIG. 6, multihop (MH) and single-hop (SH) communication are separated in different links between different devices. MH links (solid arrows) exist between BSs and RNs. SH links (dashed arrows) are established between BSs, RNs and the user terminals (UTs). Because different physical devices are part of the communication relationships the MH and SH links are separated in space. The MH area includes the BS and RNs that realize the MI-I connections as a kind of wireless high-speed backbone. SH areas exist around each BS and RN, respectively, to serve the UT on the last hop. There are quite different requirements for MH and SH communication. In summary, the Mesh air-interface can be applied to the backbone of a wireless network with a limited number of connections. Several User Terminals (UTs) shall be served by one node of the backbone network. For this purpose, the PMP air interface can be applied on the last hop towards the UT since it performs quite well for many single-hop connections. In addition, even the PMP mode with some proposed modifications can be used for a multi-hop connection but the current version of the standard does not support this mode of operation. About the comparison of PMP and Mesh modes (for multihop support the PMP mode has to be modified), some known preliminary performance results suggests that the Mesh mode can be advantageously applied for a low number of connections. Different to that PMP is better for large number of active connections. This leads to the conclusion that a combination of the protocol elements of PMP and Mesh modes in multi-hop topologies tend to be a promising approach.

The concept air-interface of FIG. 6 is considered in FIG. 7 to define a "Simplified Hierarchical PmP Multi-Hop Relaying" concept network based on the combination of PmP and Multi-Hop concepts. The considered concept network includes:

Simplified Hierarchical PmP topology, obtained by combining a linear deployment (from a logical viewpoint) of Relay Node (RN) along different branches and PmP last hop connections towards the UT around each RN. It is simplified, with respect to a generic hierarchical PmP model, in that the connection pattern to be handled by each RN is limited by the constraint that each RN is connected to two other RNs at most. On the other hand, several RN can be connected to the Base Station (BS), originating several branches (four linear branches are considered in this example). A multiplicity of terminals (UT) can be handled by each RN in the last-hop. Therefore, this example is studied as a good trade-off between the (ultra-simplified) two-hops relaying and the complexity of more general hierarchical PmP structures. Moreover, the logical topology here considered can represent a wide variety of physical deployments (taking into account that the linear displacement of RN is a requirement only from the logical and not from the physical viewpoint).

The multi-hop traffic is transmitted between one BS, which is connected to a fixed backbone network, and fixed relay nodes (RNs). The last hop traffic, takes place between the RN and a variable number of user terminals.

Discrimination between Multi-Hop and Last-Hop links is performed in the Frequency domain. More specifically, in the reported example it is assumed to use two frequencies: one is reserved for BS to RN and RN to RN (i.e., multi-hop links); one is used for the Last Hop link between RN and UT. The latter frequency is "reused" for all the "last-hop" area around each RN. The time domain is used for discriminating between uplink and downlink (TDD).

The considered Deployment Concept can be in principle realized by exploiting different variables for the discrimination of Multi-Hop and Last-Hop connections: i.e.: Time-domain, or in Time-Frequency domains, or Space-Time-Frequency domain based relaying.

Outlined Technical Problem

The multi-hop scenario depicted in FIG. 7 is expected to be adopted for extending the coverage provided by common single-hop networks, like IEEE 802.11 for etc. to perform coordinated communications among RNs and AP the connection set up can be done applying the centralized or the distributed scheduling. Centralized scheduling algorithms are performed by a central controller that provides a new resource assignment based on the actual resource allocation and requests received. On the other hand, distributed algorithms can be run by all nodes in the networks and use local information only.

In multi-hop scenario of FIG. 7 we have considered the centralized mode, since the Medium Access Control (MAC) protocol is simpler with respect to that with the distributed algorithm. It works for the general logical tree topology (Hierarchical PmP) depicted in FIG. 8, while the real topology is strictly related to the area where the network is deployed. Therefore, the overall system capacity is increased with low cost infrastructures adopting multi-hop technologies with centralized scheduling. However, limiting the delay that affects the end-to-end data traffic becomes a complex task in a multi-hop scenario, where each RN issues a request of resources only on the next link towards the destination. Each node sends an aggregate request of resources for all served terminals plus the resources required by nodes more apart from the BS. The request is computed for the next link towards the destination. The end-to-end transmission delay is affected from transmitting time on the various links, time spent into queues deployed within network elements and elaboration times. The queuing delay, referred as distributed queuing, depends on the queue deployed not only in the source but also in each intermediate node that is exploited to reach the destination.

SUMMARY

An aspect is that to reduce the end-to-end multi-hop delay affecting the known Medium Access Control (MAC) protocols in the assignment of communication resources to the various requesters, and enhance the MAC protocol for framed Physical (PHY) layer with a novel method, which is able to provide fairness with respect to the delay between communications in uplink and downlink and among communications that are different hops apart from the BS, suitable to be proposed as technology upgrade of the standard at Ref. [1].

According to the novel MAC method described below, the requests of resources for sending uplink flows from end nodes to the BS and/or downlink flows from BS to end nodes are computed by each requesting node on the end-to-end basis instead of only the next ink towards destination. This is made possible in networks with tree topology and centralized scheduling where a request of resources is computed on individual links between two adjacent nodes, and the network configuration is generally known to the requesting nodes. In practice, each requesting node issues a cumulative request given by summing up the same request for each link that separates the node from the Base Station (in uplink) plus each link separating the Base Station from the destination node (in downlink). This is also equivalent to multiply the amount of resources calculated on the first link by the number of links involved in the connection. The Base Station in response to all cumulative requests grants uplink and/or downlink resources for each link. A grant is intended as an individual permission given to the node for the use exclusive of the common resource (e.g.: the TDMA radio channel) for a fraction of time.

The idea embodied in the novel MAC method is immediately realizable in all wireless networks with the following features:
- tree topology with centralized scheduling (star and linear are particular cases of tree topology);
- the physical layer is frame-based (TDMA channel); with that the MAC can align its scheduling intervals with the underlying PHY framing.

Under the above limitations, the novel MAC method is applied by only varying the contents of the pre-existent MAC messages.

In hierarchical multihop wireless networks characterized by tree topologies, the profile of the requests on each branch stored at the Base Station side during a period of maximum activity is shaped as a triangular matrix whose columns store the requests for nodes spaced the same number of hops from the Base Station, and whose rows store the same request on each link between the BS and the node that is apart from the BS a number of hops equal to the number of the row. Nodes nearer to the base Station are more populated of requests than nodes more distant. An end-to-end path through the base station towards an end node located in another branch in respect of the source one, generates a first profile for uplink requests and a second profile for downlink requests. If the total amount of resources requested is below the maximum net throughput on MAC layer, the profiles of grants are equal to the profiles of requests. In case the total amount of requested resources is not below the maximum net throughput on MAC layer, the ideal profile of grants is normalized with respect to ratio between the maximum net throughput on MAC layer and the amount of the overall requested resources.

Performances of the Connection based Scheduling have been analyzed adopting the Ref. [1] for the Mesh air interface between BS and RNs and PMP air-interface for the last hop from the RN to the UTs. Further analysis have been performed with the air-interface for the last hop as specified in Ref. [2]. In the two cases simulation results of the mean delay as function of the load percentage for different number of hops as parameter, show that the delay is decreased below 2 TFRAME both in downlink and uplink. In particular, one frame delay is introduced by the multi-hop air-interface (Mesh), and one frame delay from the single-hop air-interface (PMP). Moreover, the scheduling algorithm is able to provide fairness with respect to the delay among uplink and downlink connections.

As conclusive remarks, the Connection based Scheduling can be proposed as efficient standard mechanism in IEEE 802.16x Mesh topologies with centralized scheduling for reducing the end-to-end transmission delay. This type of scheduling could be used in future and beyond 3G systems where the multi-hop capability is one of the key promising architecture upgrade; for example the architectures foreseen by the Wireless World Initiative New Radio (WINNER) project.

WINNER is a pre-competitive research project running within the 6th Framework of the European Commission. It commenced in January 2004 and is projected to run for a total of six years. The main aim of the WINNER project is to research technologies for future radio access networks, and concepts to combine these effectively into systems for the wireless world, with an anticipated timescale of around 2015. The scope of the project encompasses ubiquitous access across multiple domains, such as evolved cellular systems beyond 3G, hot spot and hot zone access and short range and ad hoc connections.

BRIEF DESCRIPTION OF THE DRAWINGS

These and other aspects and advantages will become more apparent and more readily appreciated from the following detailed description of exemplary embodiments thereof taken in conjunction with the accompanying drawings given for purely non-limiting explanatory purposes and wherein:

FIG. 2 is a pictorial diagram of another exemplary mesh network topology where each mesh node acts as BS for a PMP network;

FIG. 3 is a pictorial diagram of a possible two-hop communication scenario;

FIGS. 4 and 5 are block diagrams of traffic flows for PMP and Mesh mode according to Ref. [1], respectively;

FIG. 6 is a network topology diagram depicting deployment concepts for a possible multi-hop topology according to Ref. [1];

FIG. 10 is a block diagram representing a histogram of the profile of requests on each link adopting the Connection based Scheduling of FIG. 9 assuming that it is required to set up a connection between the AP and each node;

FIG. 11 is a block diagram representing a histogram of the profile of grants following the profile of requests of FIG. 10;

DETAILED DESCRIPTION OF THE PREFERRED EMBODIMENT

Figure 1:
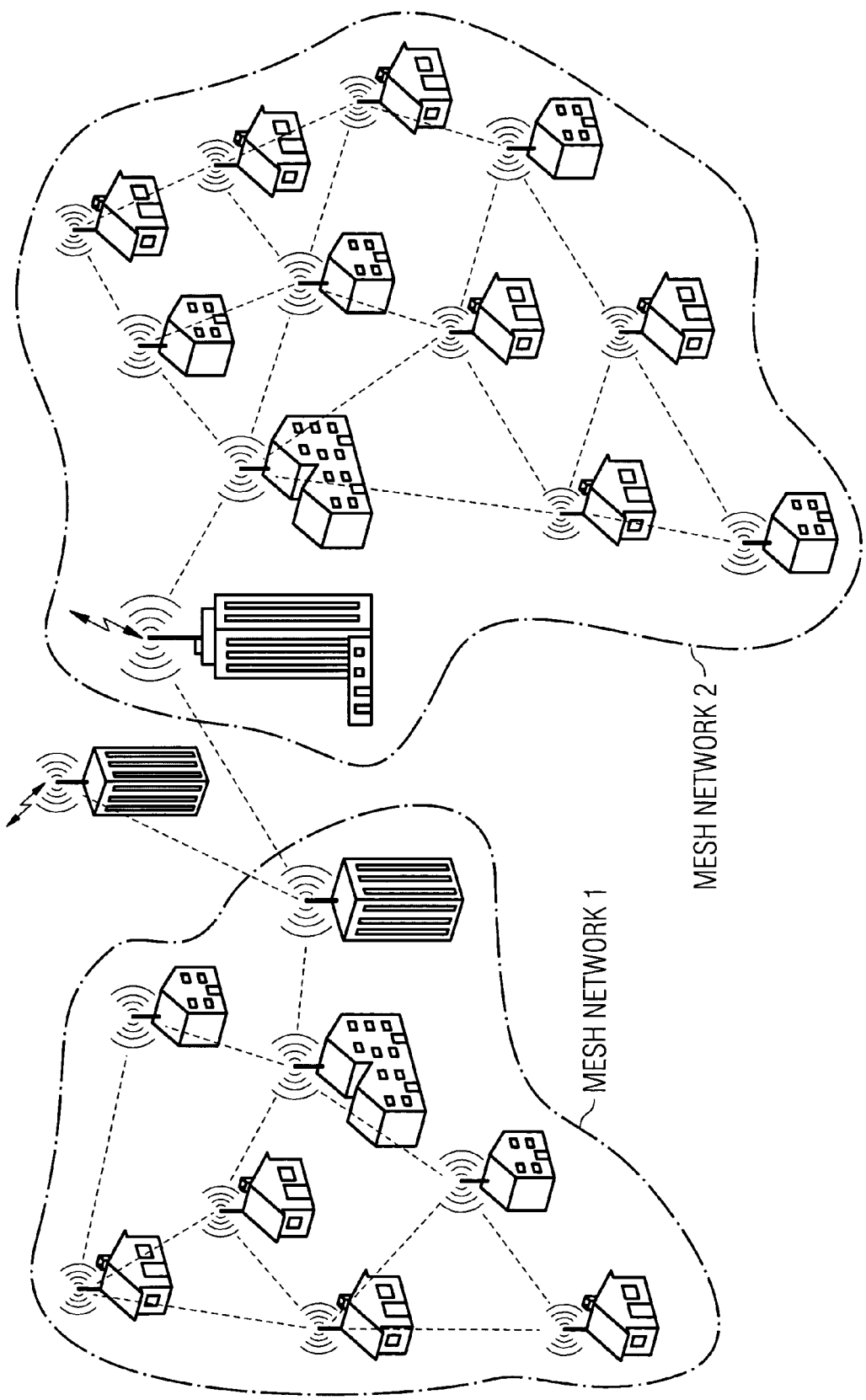
FIG. 1 is a pictorial diagram of an exemplary wireless multihop mesh network.

Reference will now be made in detail to the preferred embodiments, examples of which are illustrated in the accompanying drawings, wherein like reference numerals refer to like elements throughout.

Figure 7:
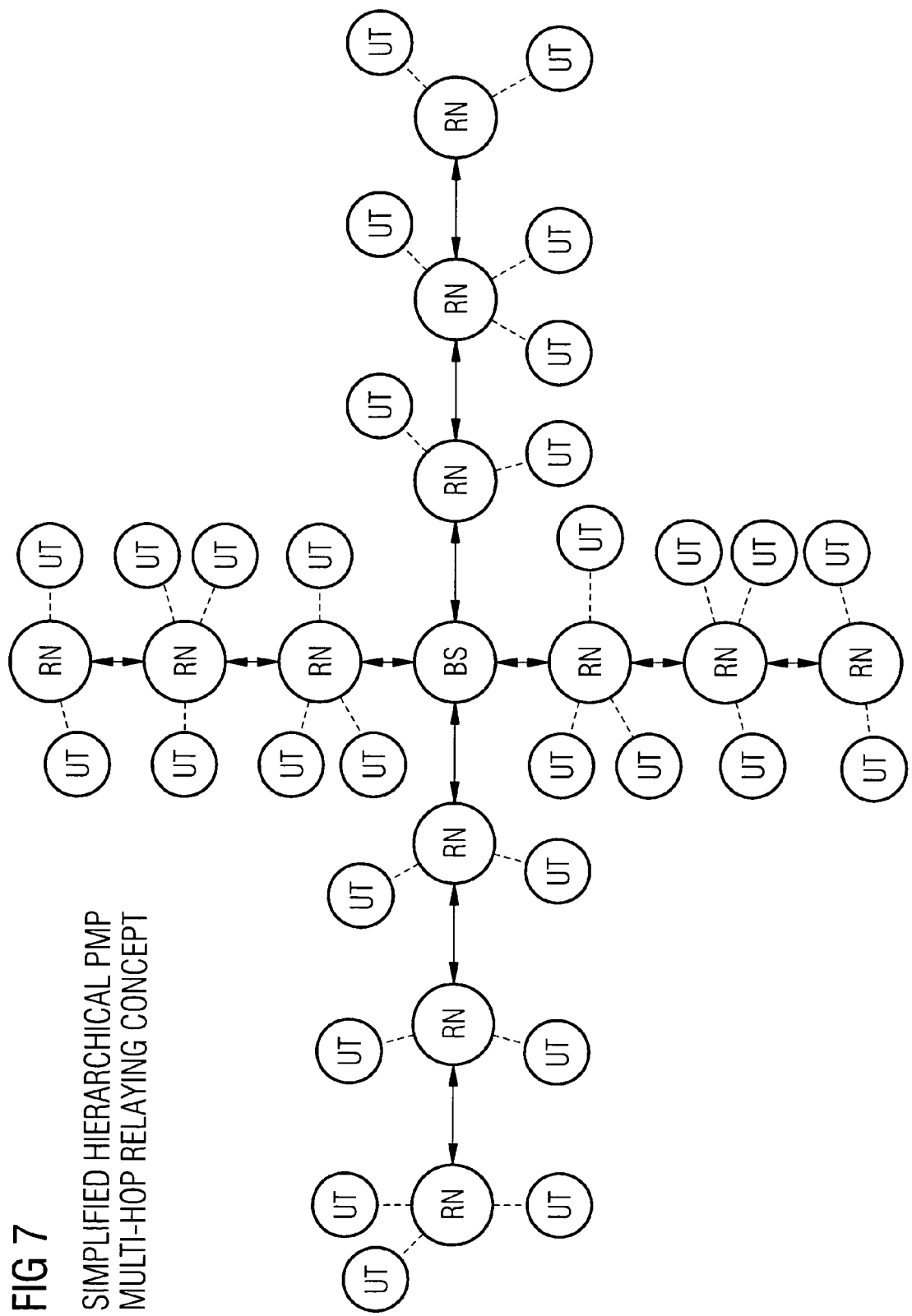
FIG. 7 is a network topology diagram of a star network suitable to extend the multi-hop topology of FIG. 6.
Figure 8:
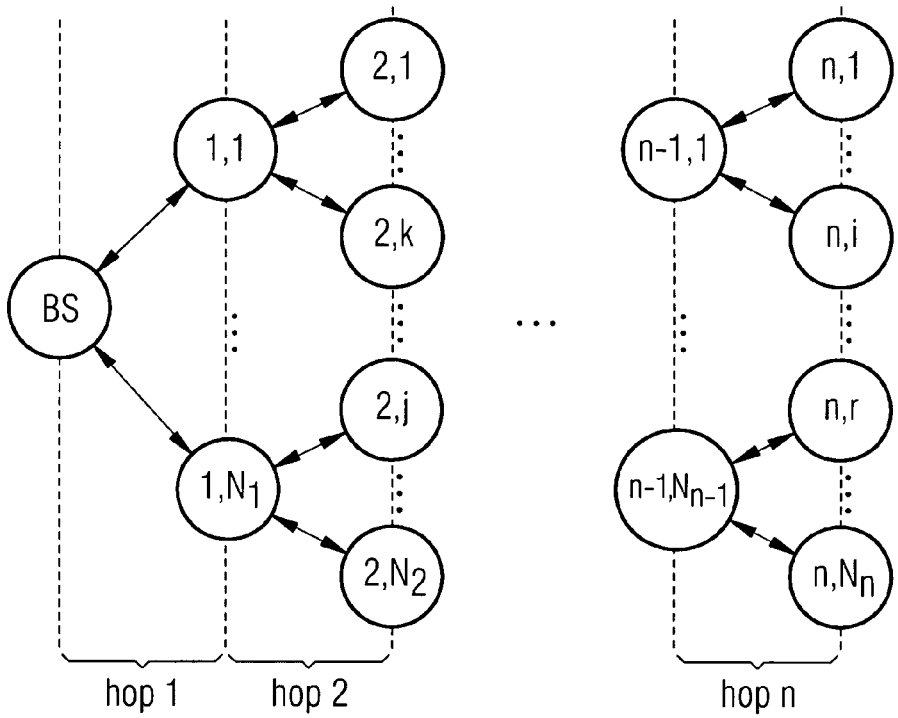
FIG. 8 is a tree topology diagram for evaluating the performance of the Connection based Scheduling in terms of end-to-end delay.
Figure 9:
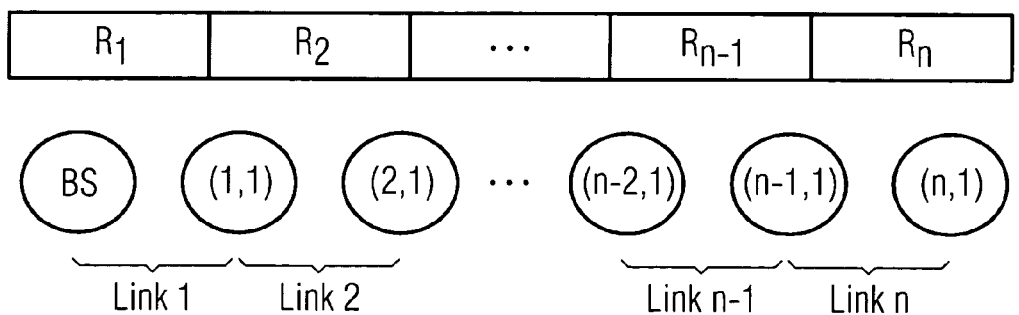
FIG. 9 is a block diagram representing a histogram of the profile of requests performed from node (n,1) adopting a Connection based Scheduling.

The novel MAC protocol of the described embodiment is triggered by a request of communication resources computed in the nodes of the centralized multi-hop topology depicted in FIGS. 7 and 8 to require resources for data transmission on uplink and/or downlink. As an upgrade of the current standardization, the request is computed on the end-to-end connection instead of only the next link towards the destination, therefore this strategy can be called "Connection based Scheduling". With reference to FIG. 8, let node (a,b) a-hop apart from the BS and:

$$1 \leq b \leq N_a \quad (1)$$

where Na is the number of nodes that are a-hop apart from the BS. Focusing on the uplink connection from node (n,1) to BS, the request message sent from node (n,1) to the BS contains resource requests not only for the next hop but also for each link towards the destination, as shown in FIG. 9. Therefore, node (n,1) sets up the same uplink request from link n (Rn) to link 1 (R1), where:

$$R_n = R_{n-1} = \ldots = R_2 = R_1 = R. \quad (2)$$

Focusing on uplink connections from each node (i,1) to the BS, with i=1, . . . , n, the node adds its own request applying the same mechanism, therefore the profile of requests is shown in FIG. 10. $R_{i,j}$ is the request on link j for the connection (uplink or downlink) between the BS and the node (i, 1).

In downlink direction the BS is the source node for each connection, therefore it sets up (virtually) the same profile of requests shown in FIG. 10. The resource allocation (grants) is provided from the BS according to the profile of requests and is shown in FIG. 11. $G_{i,j}$ is the grant on link j for the connection (uplink or downlink) between the BS and the node (i,1). The following algorithm is applied at the BS to compute grants:

1. if the amount of resources requested is below the maximum net throughput on MAC layer $$\Theta_{Net/MAC} : , \sum_{i=1}^{n} \sum_{j=1}^{i} R_{i,j} \leq \Theta_{Net/MAC} \quad (3)$$

therefore the profile of grants is equal to the profile of requests:

$$G_{i,j} = R_{i,j} \quad (4)$$

The mathematical expression for the maximum net throughput on MAC layer is the sum of the payloads per frame duration:

$$\Theta_{Net/MAC} = \frac{\sum Payload}{T_{FRAME}} \quad (5)$$

2. else if the amount of resources requested is not below the maximum net throughput on MAC layer, the profile of grants is normalized with respect to ratio between the $\Theta_{Net/MAC}$ and the amount of resources requested $R_{tot}$:

$$R_{tot} = \sum_{i=1}^{n} \sum_{j=1}^{i} R_{i,j} \quad (6)$$

$$G_{i,j} = \frac{\Theta_{Net/MAC}}{R_{tot}} \cdot R_{i,j} \quad (7)$$

3. There is residual throughput not assigned due to the normalization:

$$\Theta_{residual} = \Theta_{Net/MAC} - \sum_{i=1}^{n} \sum_{j=1}^{i} G_{i,j} \quad (8)$$

it is assigned to links maintaining the profile of grants shown in FIG. 11.

A practical example follows of how Connection based Scheduling is used for Reducing the delay in the multi-hop scenario of Refs. [1] and [2]. The IEEE Standard 802.16 provides either high speed wireless access and multi-hop capabilities through the two air-interfaces that are specified: Point-to-MultiPoint (PMP) and MultiPoint-to-MultiPoint (Mesh). In particular, the Mesh mode has been designed to support multi-hop communications. In the metropolitan environment the height of antennas may be too low for a clear Line-Of-Sight (LOS) between transmitting and receiving antenna. Hence, an advanced PHY layer design in the 2-11 GHz frequency band is necessary, since the multi-path propagation affects the quality of connections. In the IEEE Standard 802.16 there exist several PHY specifications for the 2-11 GHz spectrum. Without limitation, we have considered the Orthogonal Frequency Division Multiplexing (OFDM) transmission scheme with 256 points Fast Fourier Transformation (FFT) and Time Division Duplex (TDD) mode, which is specified for Mesh mode.

Figure 12:
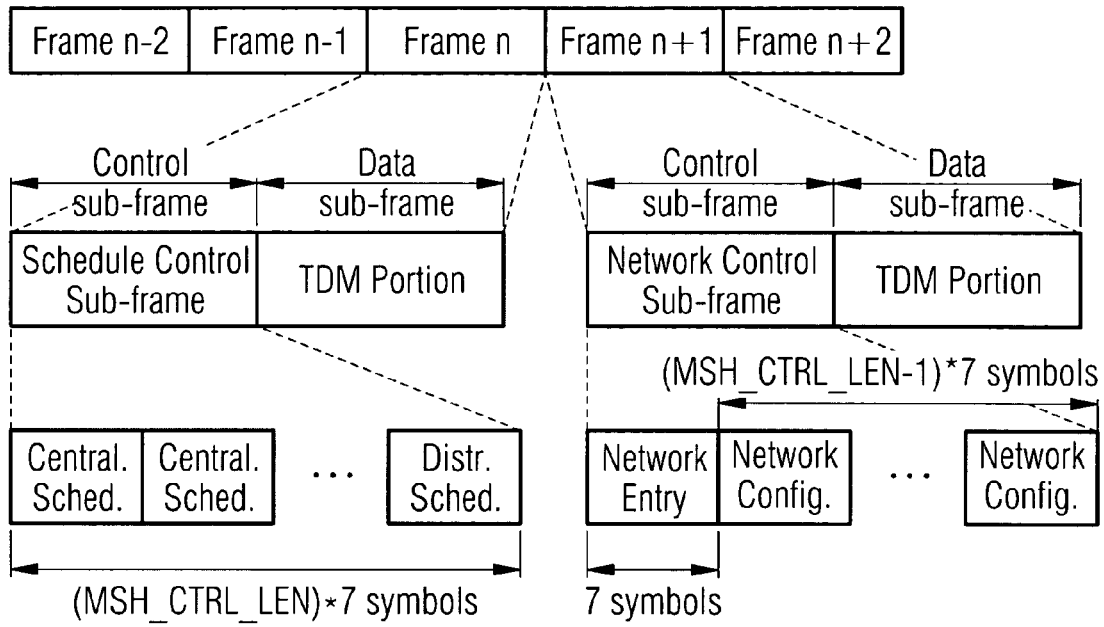
FIG. 12 is a diagram representing a mesh mode frame structure according to Ref. [1]

The Medium Access Control (MAC) controls the efficient exploitation of the medium that is shared by multiple users. The Time Division Duplexing (TDD) frame structure for the Mesh mode is illustrated in FIG. 12. A Mesh frame consists of a Control sub-frame and a Data sub-frame, which are fixed in length. The length of the Control sub-frame, $L_{cs}$, expressed as number of OFDM symbols, is fixed to:

$$L_{cs} = 7 \cdot \text{MSH\_CTRL\_LEN} \tag{9}$$

The MSH_CTRL_LEN can have a value between 0 and 15 and is distributed by the Mesh BS. Two types of Control sub-frames exist, the Network Control sub-frame and the Schedule Control sub-frame. The Schedule Control sub-frame is subdivided in Centralized Scheduling and Distributed Scheduling bursts. The Network Control sub-frame is subdivided in Network Entry and Network Configuration bursts. During frames in which the Schedule Control sub-frame is not scheduled the Network Control sub-frame is transmitted. The Network Control sub-frame serves primarily for new terminals that want to gain access to the network. It is used to broadcast network information (i.e. network topology) to all Subscriber Stations (SS) and it provides for a new node to gain synchronization and initial network entry into a Mesh network. This type of Control sub-frame occurs periodically, whereas the period is a network parameter that can be varied. The Data sub-frame includes a TDM portion.

In the following the structure of Schedule Control sub-frame and Data sub-frame of FIG. 12 is described in detail since the first sub-frame is used to transmit request and grant of resource allocation and the second sub-frame for data transmission.

Figure 13:
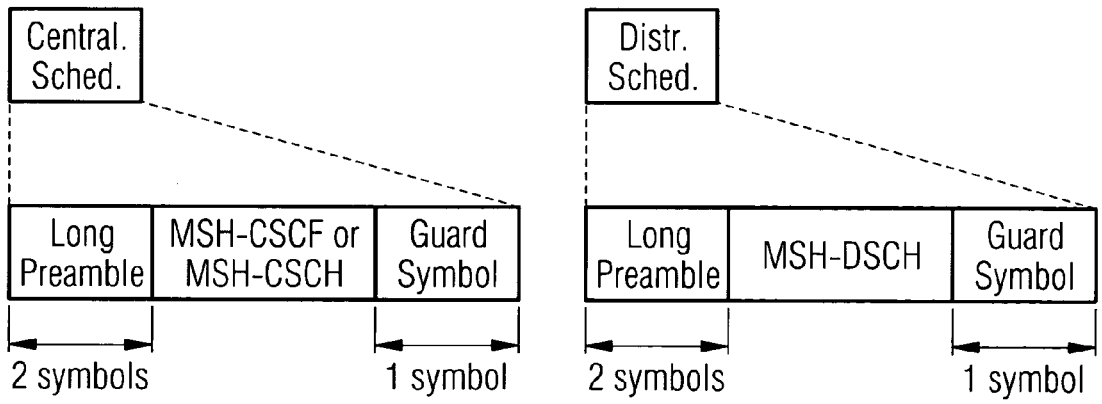
FIG. 13 is a diagram representing the structure of MAC management messages transmitted within the Schedule Control sub-frame of the a mesh mode frame of FIG. 12.

The Schedule Control sub-frame is used by the MAC according to the described method to determine the amount of allocated transmit resources for a link, which is served within the Data sub-frame. With reference to FIG. 13, the Centralized Scheduling burst includes a Long Preamble (2 OFDM symbols), either a MSH-CSCH or MSH-CSCF part, and a Guard Symbol. The Distributed Scheduling includes a Long Preamble, a MSH-DSCH part, and a Guard Symbol. The MSH-CSCH and MSH-DSCH parts convey homonym messages that shall handle portions of the network where respectively the distributed and centralized scheduling is applied. The Mesh BS decides on the number of distributed scheduling messages in the Schedule Control sub-frame and indicates this information by the MSH_DSCH_NUM field, which is transmitted in the Network Control sub-frame. From the total of MSH_CTRL_LEN control messages (FIG. 12) the first (MSH_CTRL_LEN minus MSH_DSCH_NUM) ones are allocated to transmission bursts containing Mesh Centralized Scheduling (MSH-CSCH) and Mesh Centralized Configuration (MSH-CSCF) messages. The remainder MSH_DSCH_NUM are allocated to transmission bursts containing Mesh Distributed Scheduling (MSH-DSCH) messages which are not considered by the method. The Mesh CS and Mesh DS modes can be deployed simultaneously.

The MSH-CSCH and MSH-CSCF messages together with resource requests from the RNs are used by the MAC method (protocol) of the method to perform the Connection based Scheduling strategy which controls data transmission on the Data sub-frame. Data transmissions are in the context of a link which is established between two adjacent Subscriber Stations (FIG. 8). A link is set up by a resource request initiated by a SS and terminates with a resource grant. Each RN collects requests from the served SSs into an integrated request and issues a unique cumulative request for all links up to the BS and down to the peer SS. A resource grant is intended as a permission for the use exclusive of the Data sub-frame for a fraction of time. In the Mesh CS mode, the BS grants the resources for each link in response to all cumulative requests of resources. The modalities of the Connection based Scheduling strategy are the ones already described with reference to FIG. 10 (Requests) and FIG. 11 (Grants).

Figure 14:
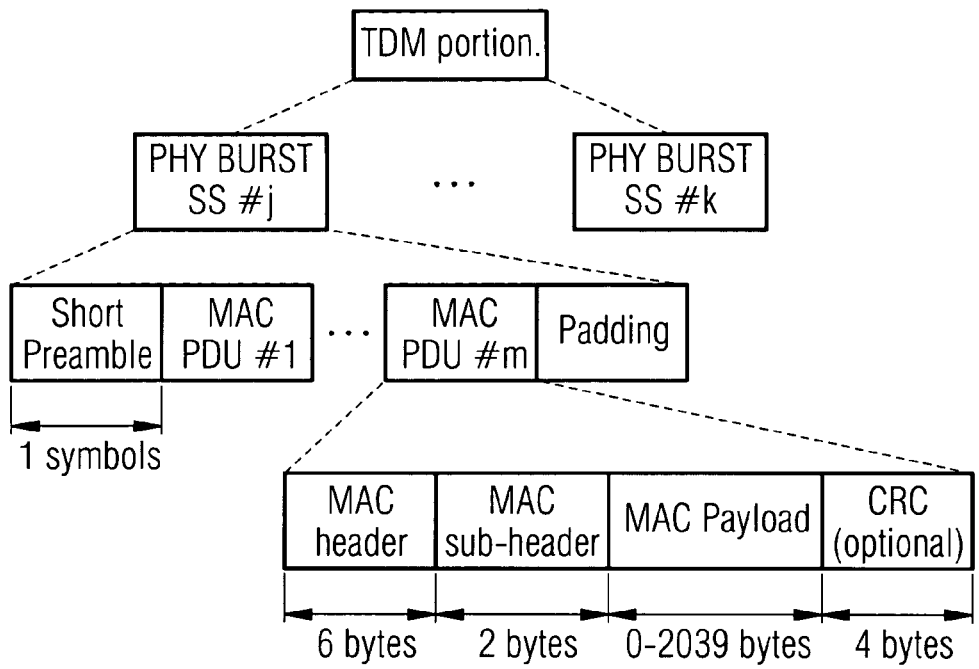
FIG. 14 is a diagram representing the structure of the Data sub-frame of the a mesh mode frame of FIG. 12.
Figure 15:
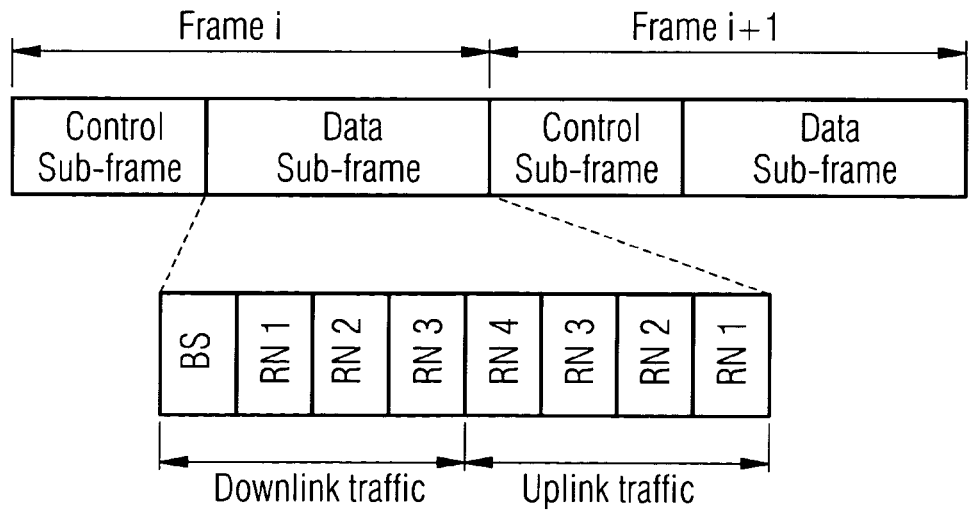
FIG. 15 is a diagram representing the data transmission order within the Data sub-frame of FIG. 14.

With reference to FIG. 14, the TDM portion of Data sub-frame is exploded into many PHY BURSTs of variable length used for user data transmissions. The PHY BURST starts with a Long Preamble (2 OFDM symbols), but neighboring SSs can negotiate to use a Short Preamble (1 OFDM symbol). MAC PDUs are inserted immediately following the preamble in order to fulfill the allocated resources. The MAC PDU consists of fixed length MAC Header, a Mesh sub-header, a variable length MAC Payload and an optional Cyclic Redundancy Check (CRC). Since the size of the payload is variable, the length of the MAC PDU can vary between 8 and 2051 bytes. Data transfer within the Data sub-frame is connection-oriented. One link shall be used for all the bidirectional data transmissions between these two SSs. Downlink and uplink sub-frames are not distinguished. The order of data transmission for downlink and uplink traffic is shown in FIG. 15. With reference to FIG. 15, we see that each Data Sub-frame is subdivided into two parts: the leftmost one for downlink transmissions of PHY BURSTs from the BS to the RNs, the rightmost one for uplink transmissions of PHY BURSTs from the RNs to the BS.

This approach is similar to the Alternating Scheduling within 2 frames presented in the following article: Matthias Lott, Simone Redana, Mattia Carlozzo, "Reducing the Delay of IEEE 802.16a in Multi-Hop Scenarios", Proceeding of WWC 2005, San Francisco, USA, May 2005, in which portions of the Data sub-frame are assigned to the terminals according to the topology. Within the portion assigned to the downlink traffic a terminal that is closer to the Base Station (AP) is served before than one more apart. On the contrary, within the portion assigned to the uplink traffic, the reverse order is applied. Adopting this approach, packets wait for being transmitted only in the source nodes and not in the forwarding nodes. Therefore, they are delivered to the destination in one frame once they are sent from the source.

Figure 16:
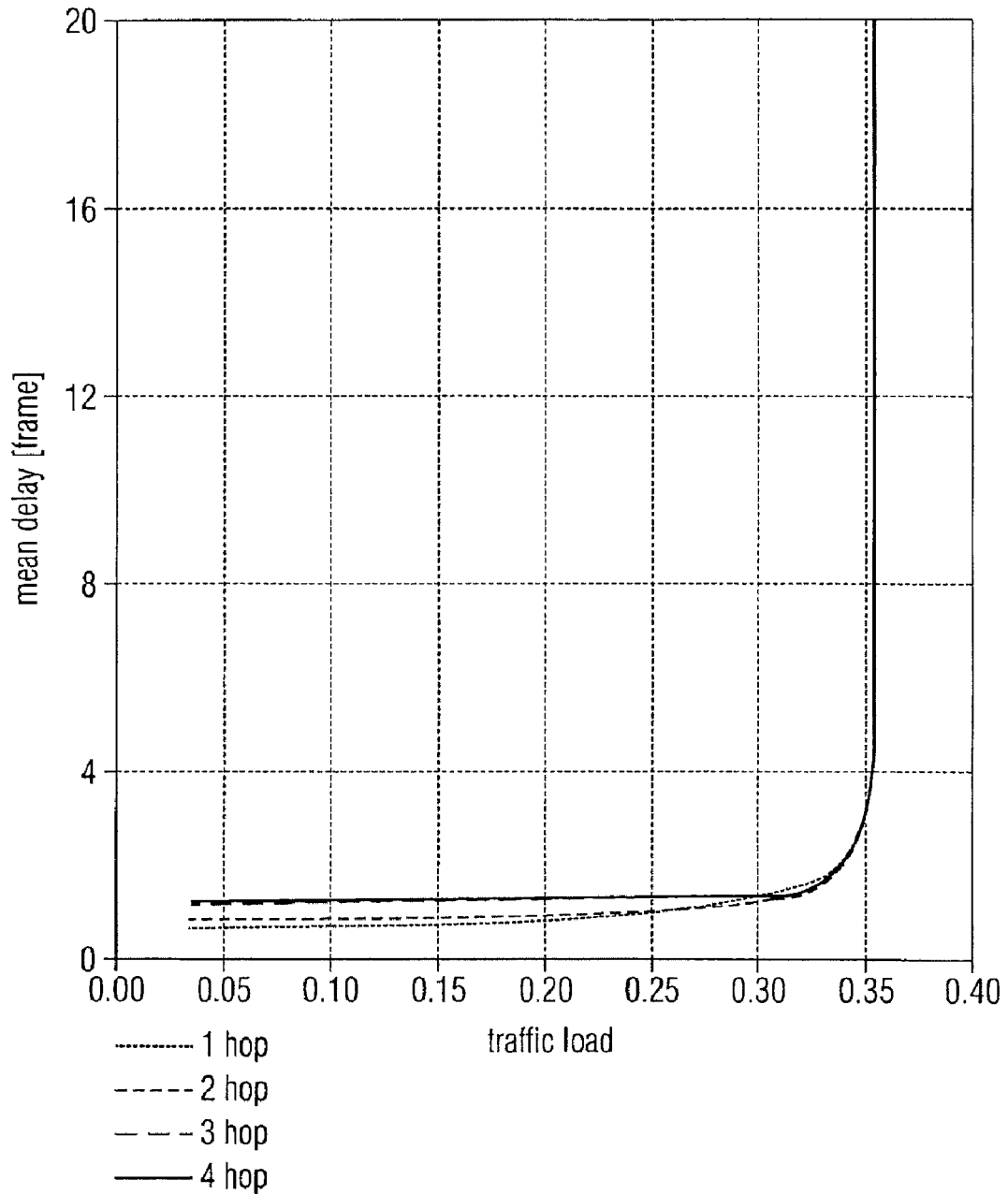
FIG. 16 is a graph of curves of end-to-end delay vs. traffic load percentage in uplink/downlink, obtained by simulating the Connection based Scheduling for different hops.

In FIG. 16 some simulation curves of the end-to-end transmission delays with Connection based Scheduling are presented for downlink and uplink communications, respectively. Results show the mean delay for different number of hops as function of the load. The load is defined as the sum of offered rate from each UT divided by the maximum rate supported by the network. We can observe that the delay is decreased below 2 $T_{FRAME}$ both in downlink and 2 $T_{FRAME}$, in particular one frame delay is introduced by the multi-hop air-interface (Mesh) and one frame delay from the single-hop air-interface (PMP). Moreover, the equivalence of the uplink and downlink curves show that the algorithm is able to provide fairness with respect to the delay among connections both in uplink and downlink directions.

On the basis of the above description some changes may be introduced in the exemplary embodiment by the skilled in the art without departing from the scope of the method.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method to control access to a time division multiple access wireless channel from nodes deployed as either a linear or tree topology network for multihop transmissions in uplink from a requesting node to a centralized node and/or in downlink from the centralized node towards an end node, comprising:

issuing network topology information from the centralized node to other nodes;

computing an amount of resources needed on each individual link between adjacent nodes, by a transmitting node on that link;

releasing permissions for exclusive use of a time division multiple access channel for a given time by the centralized node to each node along uplink and at least one downlink multihop path;

issuing from the requesting node a cumulative request for the resources needed on each link along an end-to-end path; and discriminating between multihop links and last hop links in a frequency domain, wherein the nodes are relay nodes connected point-to-multipoint to a variable number of user terminals around the nodes for last hop traffic and each relay node collects requests from all served user terminals and the cumulative request is formed for all links along the uplink and the downlink multihop path, and the centralized node grants resources for each link in response to all cumulative requests of resources received according to a grant profile, the grant profile corresponding to a profile of requests for a link, on a condition corresponding an entire amount of requested resources and a maximum permissible net throughput for the time division multiple access channel, the grant profile being calculated by normalizing the grant profile for the link with respect to a ratio between the maximum permissible net throughput and the entire amount of requested resources, and wherein the residual throughput on the time division multiple access channel not assigned due to the normalization is assigned to links maintaining a shape of the profile of requests.

2. The method of claim 1, wherein the centralized node grants resources for each link according to a profile of grants equal to a profile of the requests for that link, on condition that an entire amount of requested resources is below a maximum permissible net throughput for the time division multiple access channel.

3. The method of claim 1, wherein the profile of grants calculated during a period of maximum activity is shaped as a triangular matrix whose columns store grants issued to nodes spaced a same number of hops from the centralized node and whose rows store the same request on each link between the centralized node and a node that is separated from the centralized node by a number of hops equal to the number of the row.

4. The method of claim 1, wherein the centralized node grants resources for each link according to a grant profile lower than the profile of the requests for that link, on condition that an entire amount of requested resources is not below a maximum permissible net throughput for the time division multiple access channel.

5. The method of claim 4, wherein the cumulative request is determined by multiplying an amount of resources calculated on a first link of the multihop path by an overall number of links on the multihop path.

6. The method of claim 4, wherein the time division multiple access channel is subdivided in frames and each frame is subdivided into a control sub-frame and a sub-frame dedicated to data transmission, each sub-frame dedicated to data transmission is divided into two contiguous portions, a first portion dedicated to downlink traffic and a second portion dedicated to uplink traffic, and within the first portion a node closer to the centralized node is served before a more distant node, while a reverse order is used within the second portion.

7. The method of claim 6, wherein the method is directly utilizable with mesh architecture specified in IEEE 802.16x, by only changing contents of Medium Access Control messages.

8. The method of claim 1, wherein the cumulative request is formed for all links up to a base station and down to a peer user terminal.

* * * * *

UNITED STATES PATENT AND TRADEMARK OFFICE
CERTIFICATE OF CORRECTION

PATENT NO. : 8,401,020 B2  
APPLICATION NO. : 11/988182  
DATED : March 19, 2013  
INVENTOR(S) : Antonio Capone et al.

Page 1 of 1

It is certified that error appears in the above-identified patent and that said Letters Patent is hereby corrected as shown below:

On the Title Page, item [57]: (Abstract), Line 13, delete "through-put" and insert
-- throughput --, therefor.

In the Claims:
Column 12, Line 27, In Claim 5, delete "claim 4," and insert -- claim 1, --, therefor.
Column 12, Line 31, In Claim 6, delete "claim 4," and insert -- claim 1, --, therefor.

Signed and Sealed this
Sixteenth Day of July, 2013

Teresa Stanek Rea
*Acting Director of the United States Patent and Trademark Office*